(12) United States Patent
Carozzani et al.

(10) Patent No.: US 11,156,964 B2
(45) Date of Patent: Oct. 26, 2021

(54) HAND COMPRISING AN END PIECE AND ASSEMBLY METHOD

(71) Applicant: The Swatch Group Research and Development Ltd, Marin (CH)

(72) Inventors: Tommy Carozzani, Neuchatel (CH); Yves Winkler, Schmitten (CH)

(73) Assignee: The Swatch Group Research and Development Ltd, Marin (CH)

( * ) Notice: Subject to any disclaimer, the term of this patent is extended or adjusted under 35 U.S.C. 154(b) by 451 days.

(21) Appl. No.: 16/080,946

(22) PCT Filed: Jan. 13, 2017

(86) PCT No.: PCT/EP2017/050706
§ 371 (c)(1),
(2) Date: Aug. 29, 2018

(87) PCT Pub. No.: WO2017/157540
PCT Pub. Date: Sep. 21, 2017

(65) Prior Publication Data
US 2019/0121294 A1   Apr. 25, 2019

(30) Foreign Application Priority Data
Mar. 15, 2016   (EP) .................................... 16160419

(51) Int. Cl.
*G04B 19/04* (2006.01)
*F16B 21/07* (2006.01)
(52) U.S. Cl.
CPC .......... *G04B 19/042* (2013.01); *F16B 21/071* (2013.01)
(58) Field of Classification Search
CPC ...... G04B 19/04; G04B 19/042; B60K 37/02; F16B 21/071

USPC .................................................... 116/47, 330
See application file for complete search history.

(56) References Cited

U.S. PATENT DOCUMENTS

| | | | | | |
|---|---|---|---|---|---|
| 2,100,833 | A | * | 11/1937 | Haas ....................... | G01D 11/10 116/330 |
| 3,117,412 | A | * | 1/1964 | Malone ................ | G04B 47/061 368/80 |
| 3,142,148 | A | * | 7/1964 | Morgan ............... | G04B 19/042 368/238 |
| 6,519,853 | B1 | * | 2/2003 | Machida .............. | G04B 19/042 29/896.3 |
| 2006/0209637 | A1 | * | 9/2006 | May ....................... | G04C 17/00 368/223 |
| 2013/0163391 | A1 | | 6/2013 | Helfer et al. | |

(Continued)

FOREIGN PATENT DOCUMENTS

EP   2 400 353 A1   12/2011
EP   2 605 086 A1   6/2013

(Continued)

OTHER PUBLICATIONS

International Search Report dated Apr. 10, 2017 in PCT/EP2017/050706 filed Jan. 13, 2017.

*Primary Examiner* — Sean Kayes
(74) *Attorney, Agent, or Firm* — Oblon, McClelland, Maier & Neustadt, L.L.P.

(57) ABSTRACT

A device including a first part and at least a second part to be assembled to the first part, the first part including a body from which an attachment extends, the attachment defining a housing for the second part, for example as a timepiece hand.

17 Claims, 4 Drawing Sheets

(56) References Cited

U.S. PATENT DOCUMENTS

| | | | |
|---|---|---|---|
| 2014/0064043 A1 | 3/2014 | Tsuchiya et al. | |
| 2015/0109891 A1* | 4/2015 | Stranczl | G04B 19/046 368/238 |
| 2016/0170375 A1* | 6/2016 | Christan | G04B 17/325 368/325 |
| 2017/0108832 A1* | 4/2017 | Mansfield | G04B 19/048 |

FOREIGN PATENT DOCUMENTS

| | | |
|---|---|---|
| EP | 2 706 415 A2 | 3/2014 |
| JP | 2001-124869 A | 5/2001 |

\* cited by examiner

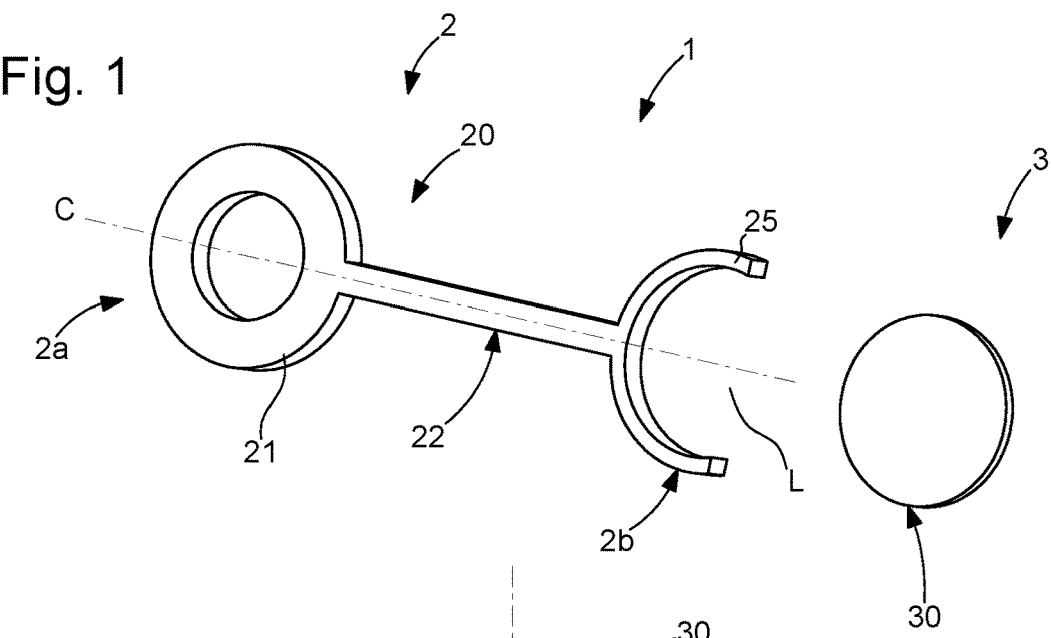
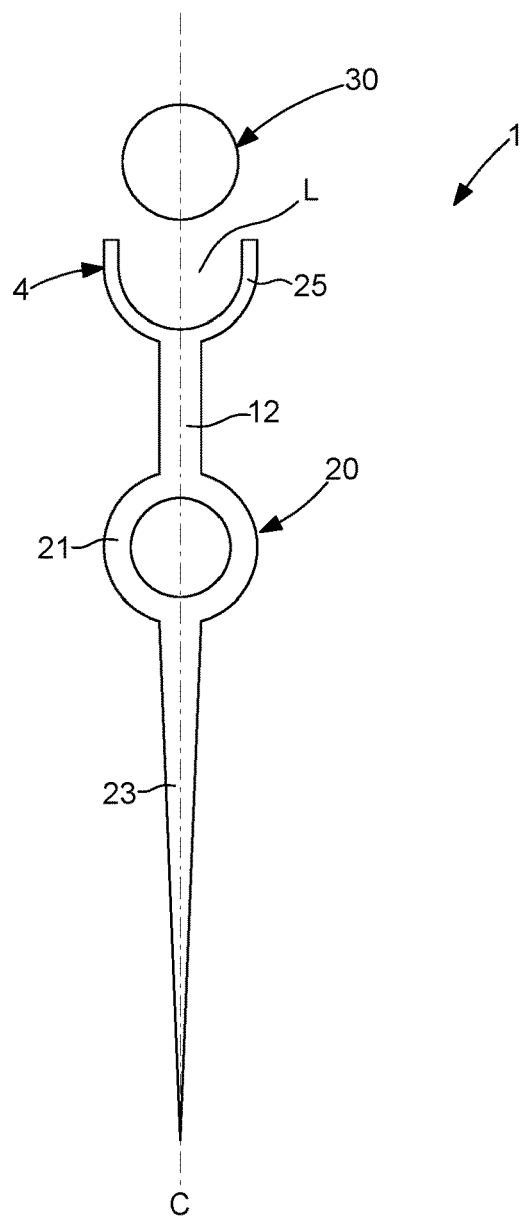

HAND COMPRISING AN END PIECE AND ASSEMBLY METHOD

The present invention concerns a device including a first part and at least a second part to be assembled to the first part.

More precisely, the present invention concerns a hand on which an interchangeable end piece is assembled, and a method for assembling an end piece on a hand.

BACKGROUND OF THE INVENTION

There are numerous components, particularly in the field of horology, which require the assembly of at least two parts to one another. Currently, the assembly of a component composed of an amorphous metal part to another part made of any material can be achieved using various techniques.

A conventional technique consists in using a third body such as adhesive or solder. The adhesive or solder acts as an interface between the amorphous metal part and the part made of any material. However, these bonding or soldering techniques have drawbacks. Indeed, the soldering technique involves the use of a heat source capable of causing changes in mechanical or aesthetic properties, whereas the use of an adhesive necessarily involves choosing an adhesive suitable for the environment in which the component will function, whilst ensuring that the adhesive does not disrupt smooth operation of the component and provides stable adhesion over time. Further, glued or soldered assemblies are not easy to disassemble and reassemble.

Another technique consists in using the properties of the hot forming process for amorphous metals. Indeed, amorphous metals have the peculiarity that their viscosity changes when they are heated to a temperature comprised between the glass transition temperature and the crystallisation temperature of the material. In this range, the viscosity of said material is greatly diminished so that it becomes very easy to deform. A low stress of around 1 MPa can thus be applied to said material to shape it. However, this assembly technique generally requires the arrangement of securing devices such as hollows or projecting portions in order to improve the adhesion of the amorphous metal. These securing areas are often complex to make. With this approach, the assembly is permanent and cannot be disassembled.

However, when the parts to be assembled are very small, particularly in the case of a timepiece hand, the techniques of the prior art are difficult to use.

SUMMARY OF THE INVENTION

It is an object of the invention to overcome the drawbacks of the prior art by proposing an assembly method allowing assembly of very small parts in an aesthetic way, and particularly an end piece on a hand.

The invention intends, in particular, to propose an assembly method allowing an interchangeable end piece to be assembled in a simple manner to a timepiece hand.

To achieve this, according to a first aspect of the invention, there is proposed a method for assembling a device comprising a timepiece hand and at least one end piece to be assembled to one end of the hand, the hand being made of an at least partially amorphous metal material, characterized in that said method further includes the following steps:
taking the hand and the end piece, the hand including a body and attachment means defining a housing, the attachment means including two elastic arms made of at least partially amorphous metal material;
deforming the attachment means by exerting a force in order to temporarily enlarge the housing;
placing the end piece inside the housing;
releasing the force exerted on the attachment means to allow the housing to return to its initial dimensions and hold the end piece.

Another aspect of the invention concerns a method for assembling a device comprising a timepiece hand and at least one end piece to be assembled to one end of the hand, the end piece being made of an at least partially amorphous metal material, characterized in that said method further includes the following steps:
taking the hand and the end piece, the hand including a body and attachment means defining a housing, the attachment means including two arms;
elastically deforming the end piece by exerting a force in order to insert it into the housing of the hand;
placing the end piece inside the housing;
releasing the force exerted on the end piece so that it fills the housing and is held by the attachment means of the hand.

According to different embodiments:
the force may be exerted by means of a tool;
the steps of deformation, insertion and releasing the exerted force can be grouped into a single step of press fitting the second part;
the end piece may be a decorative element taken from the following group: shaped indicator adapted to suit the timepiece design, said indicator could take the form of a butterfly, flower, arrow, ball, celestial body, coloured palette stone, precious stone;
the end piece may be a functional element taken from the following group: pipe, arbor, counterweight, indicator, vernier, magnifying glass, disc of fluorescent or phosphorescent material, LED;
the metal material may be totally amorphous;
the metal material may be at least 50% amorphous.

Another aspect of the invention concerns a device comprising a hand for a timepiece and at least one end piece to be assembled to one end of the hand, the hand including a body from which attachment means extend, the attachment means including two elastic arms, the attachment means defining a housing for the end piece, the two elastic arms being made of an at least partially amorphous metal material allowing the attachment means to be deformed to temporarily enlarge said housing for insertion of the end piece.

Another aspect of the invention concerns a device comprising a hand for a timepiece and at least one end piece to be assembled to one end of the hand, the hand including a body from which attachment means extend, the attachment means including two elastic arms defining a housing for the end piece, the end piece being made from an at least partially amorphous metal material allowing it to be temporarily deformed for insertion into the housing.

According to different embodiments:
the end piece can be cylindrical;
the end piece can be oval;
the end piece can have a diameter of between 0.5 mm and 5 mm;
the end piece can be a magnifying glass;
the end piece can be a counterweight;
the end piece can be a decorative element;
the end piece can be an indicator;
the end piece can be a pipe or an arbor onto which said hand is secured.

BRIEF DESCRIPTION OF THE DRAWINGS

The objects, advantages and features of the method according to the present invention will appear more clearly in the following detailed description of at least one embodiment of the invention, given solely by way of non-limiting example and illustrated by the annexed drawings, in which:

FIGS. 1 and 2 represent schematically the device using the method according to the present invention.

DETAILED DESCRIPTION

Figure 3:
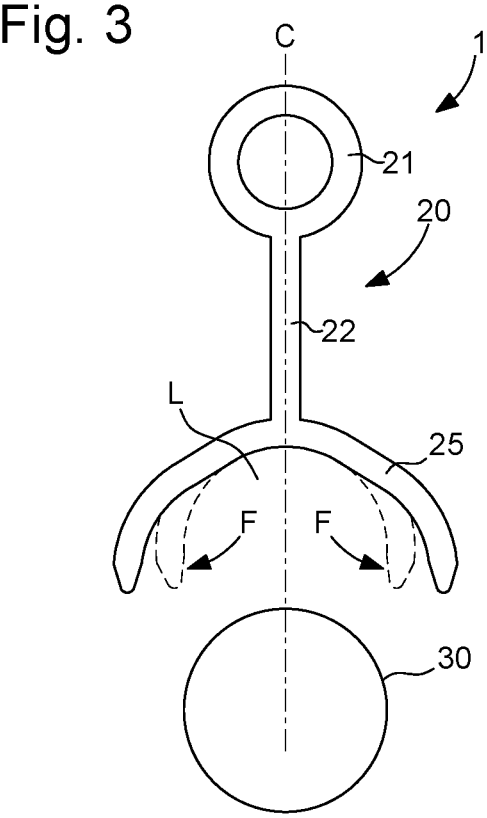
FIGS. 3 to 5 represent schematically the assembly method according to one embodiment of the invention.

FIG. 1 shows a device 1 comprising a first part 2 and at least a second part 3. The first part is a timepiece hand. It has a length comprised between 3 mm and 30 mm. The hand has a width comprised between 300 μm and 5 mm. The hand has a thickness comprised between 50 μm and 1 mm. The second part is an end piece 30 intended to be assembled on one end of the hand. Thus, according to various embodiments, the end piece may be:

- a functional element, such as for example an arbor, a pipe, a magnifying glass, an indicator, a vernier, a counterweight, an LED for illuminating the dial or the end of the hand.
- a decorative element, such as for example a precious stone, a coloured palette stone, a butterfly or any other element related to the timepiece design.

The first part is formed of a body 2a and attachment means 2b allowing assembly to second part 3.

In the case of a hand, there are several possibilities. A first possibility is that element 30 assembled to the hand is a functional element. For example, element 30 could be an indicator element which will be used to indicate information or element 30 could be a magnifying glass for enlarging information to make it easier to read. In that case, body 2a includes a circular base 21 for securing the hand to the movement. From this circular base, an elongated piece 22 extends to carry attachment means 2b as seen in FIGS. 1 to 9.

Figure 8:
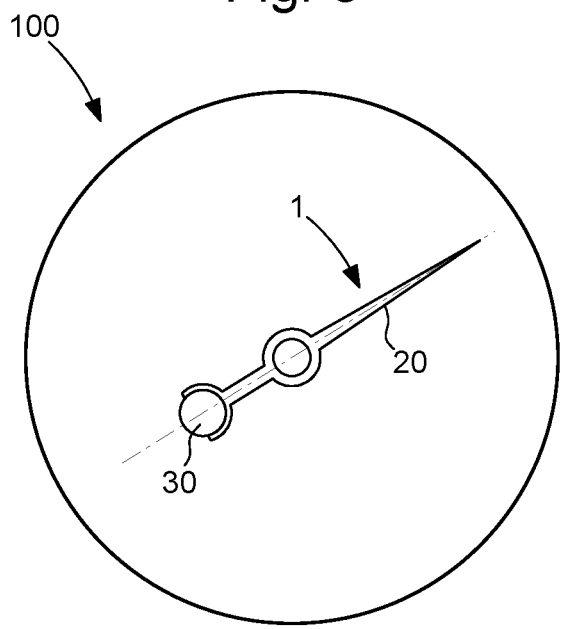
FIGS. 8 to 11 represent schematically the device using the method according to the present invention in use.
Figure 9:
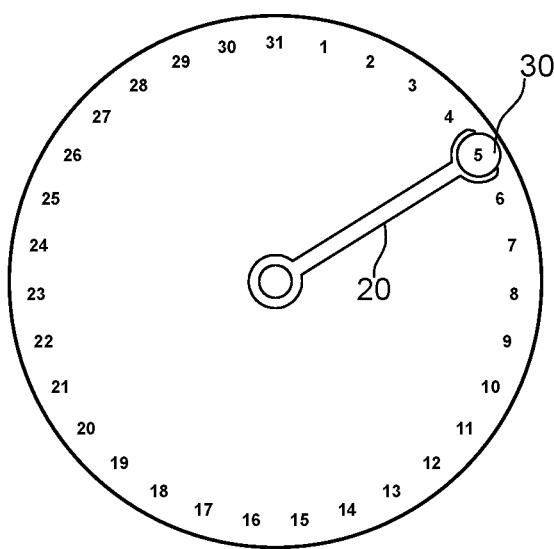

A second possibility is that element 30 assembled to the hand is a decorative element. For example, element 30 will be the unbalance of a hand. In that case, body 2a includes a circular base 21 for securing the hand to the movement. From this circular base, a first elongated piece 23 extends and narrows to form the actual hand. A second support piece 22 extends, diametrically opposite the first elongated piece, for carrying attachment means 2b, as seen in FIGS. 2 and 8.

Advantageously according to the invention, attachment means 2b comprise at least one elastic arm 25, and preferably two elastic arms, extending from body 2a of the first element. Each elastic arm 25 has a shape that allows it to define a housing L inside which the second part will be placed for assembly.

The objective of this elastic arm 25 is to be capable of deformation to temporarily enlarge the housing. Once the housing has been enlarged, it becomes possible to place the second part therein, before the housing returns to its initial dimensions.

Cleverly according to the invention, elastic arm 25 is made of an at least partially amorphous material comprising at least one metallic element such as an at least partially amorphous metal alloy. More specifically, the elastic arm is preferably made from an at least 50% amorphous metal alloy. Preferably, the first part, comprising the body from which said elastic arm extends, is made from an at least partially amorphous metal material.

This metal element may be a conventional metal element of the iron, nickel, zirconium, titanium or aluminium type or a precious metal element such as gold, platinum, palladium, rhenium, ruthenium, rhodium, silver, iridium or osmium. An 'at least partially amorphous material' means that the material is capable of at least partially solidifying in amorphous phase, i.e. it is subject to an increase in temperature above its melting temperature causing it to lose any local crystalline structure locally, said increase being followed by cooling to a temperature lower than its glass transition temperature allowing said material to become at least partially amorphous. This material can thus be a metal alloy.

An amorphous material is used because it has the advantage that, during manufacture, its atoms do not arrange themselves in a particular structure as is the case of crystalline materials. Thus, even if the Young's modulus E of a crystalline metal and that of an amorphous metal are close, the limit of elasticity $\sigma_e$ is different. An amorphous metal differs therefore in that it has a higher limit of elasticity $\sigma_{eA}$ than that $\sigma_{ec}$ of crystalline metal by a factor of between two to four. This means that amorphous metals can withstand higher stress before reaching elastic limit $\sigma_e$.

Consequently, having an elastic arm 25 made of an amorphous metal material means that a higher stress can be applied before the arm deforms plastically, i.e. permanently. Consequently, it becomes possible to deform arm 25 to a greater extent in order to temporarily enlarge housing L. Being able to enlarge housing L to a greater extent facilitates assembly. Further, the holding force of the assembly, ensured by the elastic return of the arm, will be greater, and around ten times greater than values obtained with crystalline metals.

In an advantageous variant, attachment means 2b include two elastic arms 25. These two elastic arms 25 are arranged to define said housing. In a representative example, the two arms are made to be symmetrical with respect to the longitudinal axis C of the hand. This configuration makes it possible to obtain better holding force since the latter is provided by two arms instead of one.

In order to assemble the first part and the second part, the first step consists in taking the first part and the second part.

In a second step, the housing L formed by attachment means 2b is then enlarged. This second step consists in taking a tool designed to exert a force/stress F on the elastic arm or arms 25. This stress then causes a deformation of the elastic arm or arms. The tool is then made so that the stress that it applies to the elastic arm or arms deforms them such that housing L defined by said elastic arms 25 is temporarily enlarged, as seen in FIG. 3.

Figure 4:
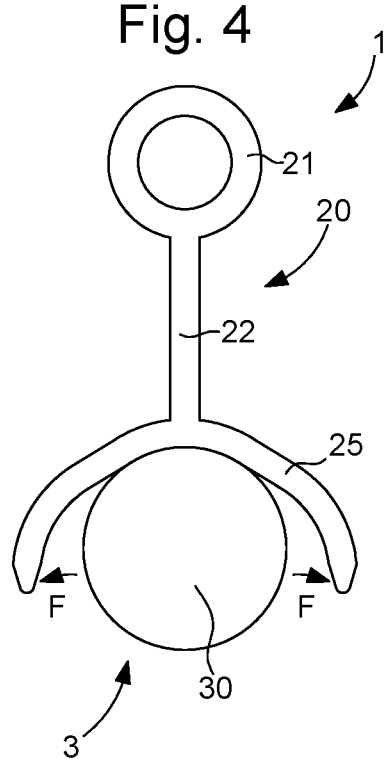
Figure 5:
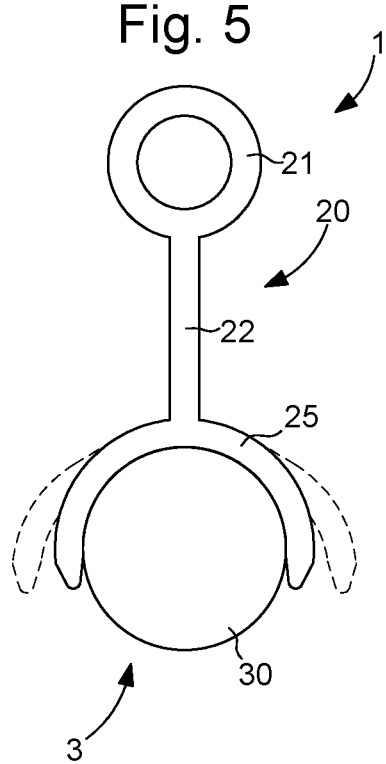

Once housing L has been enlarged, second part 30 is inserted into the housing. To do this, the operator grips second part 3 by hand or via a gripping tool and inserts second part 3 into the housing while continuing to apply stress on the arm(s) as seen in FIG. 4.

In then next step, when second part 3 is inserted into the housing, stress F on arms 25 is released. This release of stress means that elastic arm(s) 25 tend to return to their rest position. By resuming their rest position, arms 25 apply a holding force on second part 3, so that first part 2 and second part 3 form an assembly which is the final device 1 seen in FIG. 5.

In a variant, the step of deforming the elastic arms and the step of inserting the second part into the housing are combined. Indeed, the elastic arm(s) 25 form an open housing L, i.e. the arms do not completely encircle second part 3 once the latter is assembled.

Figure 6:
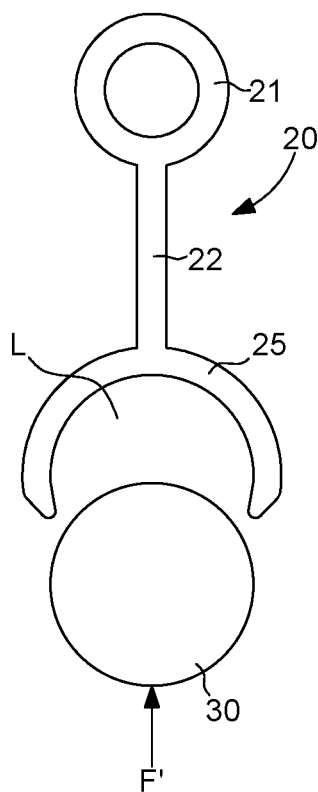
FIGS. 6 to 7 represent schematically a variant of the assembly method according to the present invention.
Figure 7:
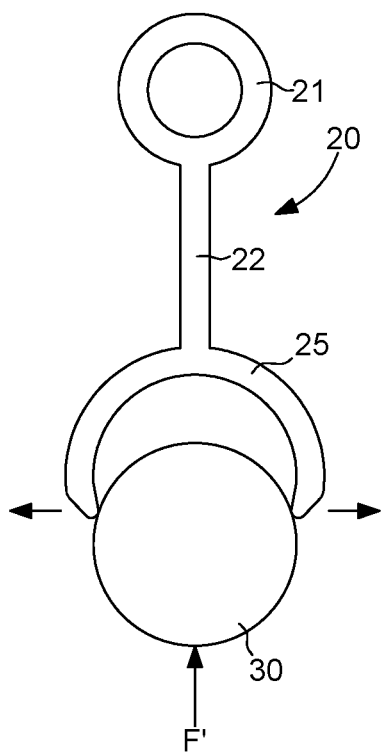

In this variant, the elastic arm(s) 25 are thus designed to have a shape that allows them to deform when second part 3 is snapped into the housing with a force F'. This deformation causes a temporary enlargement of said housing L facilitating the insertion of the second part as seen in FIGS. 6 and 7.

When second part 3 is inserted into the housing, the stress on arm(s) 25 is naturally released. Elastic arm(s) 25 return to their rest position. By resuming their rest position, the arm or arms apply a holding force on second part 3, so that the first part and second part form an assembly which is the final device.

To strengthen the retention of second part 3, it is possible for the latter to have, for example, a groove into which the elastic arms are inserted.

Figure 10:
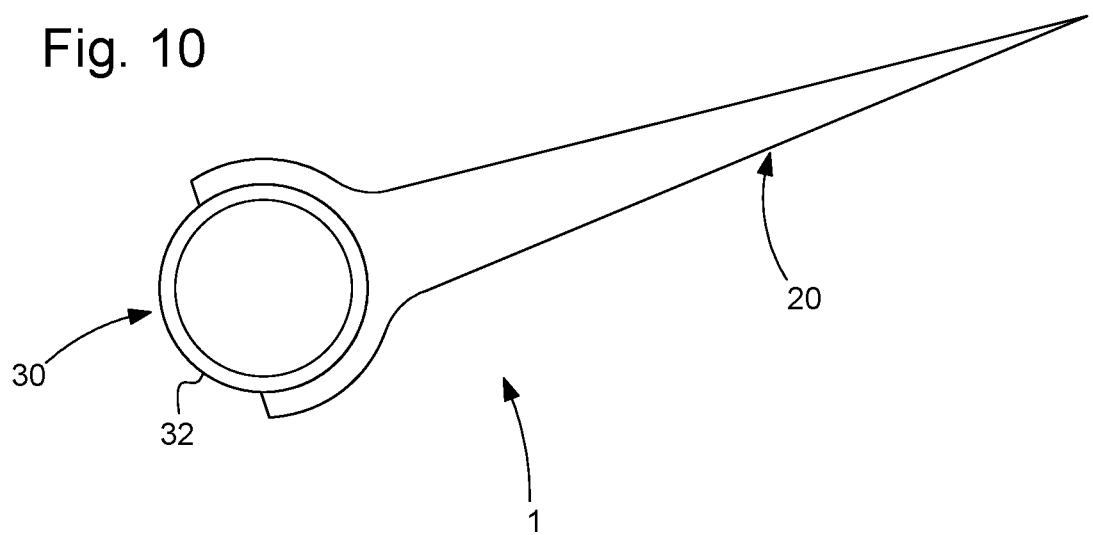

It is evidently possible to use the same technique to secure a hand on its drive arbor or pipe 32, rather than a press fitting via area 21 as seen in FIG. 10.

Figure 11:
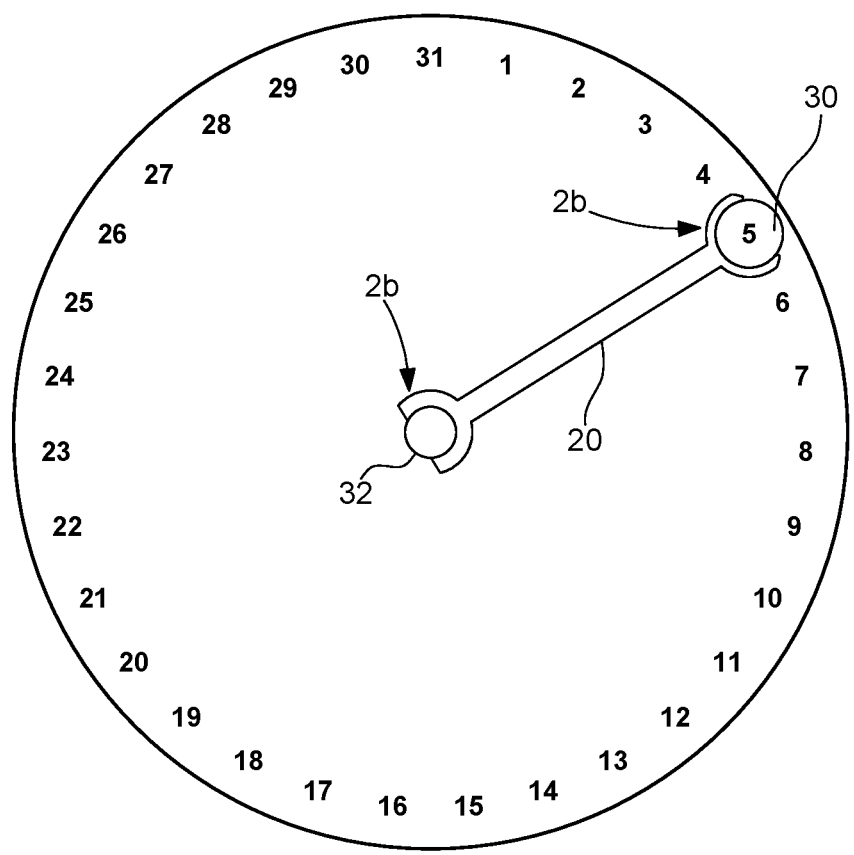

By combining the two, it is possible to obtain a part 2 with one or more elastic arms on either side of support piece 23, allowing a second decorative or functional part to be secured or held, and then to assemble this assembly to its drive arbor using the same method, as seen in FIG. 11.

It is also possible for it to be the second part, and not the first that is made of partially amorphous metal, and for the second part to deform in the insertion step before returning to its initial shape to fill the housing. This may be used, for example, in order to easily change the shape of the end of a hand (arrowhead or semi-circle, etc. . . . ).

It will be clear that various alterations and/or improvements and/or combinations evident to those skilled in the art may be made to the various embodiments of the invention set out above without departing from the scope of the invention defined by the annexed claims.

The invention claimed is:

1. A method for assembling a device including a timepiece hand and at least one end piece to be assembled to one end of the hand, the hand being made of an at least partially amorphous metal material, the method comprising:
    taking the hand and the end piece, the hand including a body and attachment means defining a housing, the attachment means including two elastic arms made of at least partially amorphous metal material;
    deforming the attachment means by exerting a force to temporarily enlarge the housing;
    after the deforming, placing the end piece inside the housing;
    after the placing, releasing the force exerted on the attachment means to allow the housing to return to its initial dimensions and hold the end piece,
    wherein the hand includes a base to attach the hand to a movement, and the two elastic arms are positioned at an opposite end of the hand from the base in a longitudinal direction of the hand.

2. An assembly method according to claim 1, wherein the force is exerted by a tool.

3. An assembly method according to claim 1, wherein the end piece is a decorative element.

4. An assembly method according to claim 1, wherein the end piece is a functional element taken from the following group: pipe, arbor, counterweight, indicator, vernier, magnifying glass, disc of fluorescent or phosphorescent material, LED.

5. An assembly method according to claim 1, wherein the metal material is completely amorphous.

6. An assembly method according to claim 1, wherein the metal material is at least 50% amorphous.

7. A method for assembling a device including a timepiece hand and at least one end piece to be assembled to one end of the hand, the end piece being made of an at least partially amorphous metal material, the method comprising:
    taking the hand and the end piece, the hand including a body and attachment means defining a housing, the attachment means including two arms;
    elastically deforming the end piece by exerting a force to insert the end piece into the housing of the hand;
    after the deforming, placing the end piece inside the housing;
    after the placing, releasing the force exerted on the end piece so that the end piece fills the housing and is held by the attachment means of the hand,.
    wherein the hand includes a base to attach the hand to a movement, and the two arms are positioned at an opposite end of the hand from the base in a longitudinal direction of the hand.

8. A device comprising:
    a hand for a timepiece; and
    at least one end piece to be assembled to one end of the hand,
    the hand including a body from which attachment means extend,
    the attachment means including two elastic arms, the attachment means defining a housing for the end piece, the two elastic arms being made of an at least partially amorphous metal material allowing the attachment means to be deformed to temporarily enlarge the housing for insertion of the end piece,
    wherein the hand includes a base to attach the hand to a movement, and the two elastic arms are positioned at an opposite end of the hand from the base in a longitudinal direction of the hand.

9. A device according to claim 8, wherein the end piece is cylindrical.

10. A device according to claim 8, wherein the end piece is oval.

11. A device according to claim 8, wherein the end piece has a diameter between 0.5 mm and 5 mm.

12. A device according to claim 8, wherein the end piece is a magnifying glass.

13. A device according to claim 8, wherein the end piece is a counterweight.

14. A device according to claim 8, wherein the end piece is a decorative element.

15. A device according to claim 8, wherein the end piece is an indicator.

16. A device according to claim 8, wherein the end piece is a pipe or an arbor on which the hand is secured.

17. A device comprising:
    a hand for a timepiece; and
    at least one end piece to be assembled to one end of the hand,
    the hand including a body from which attachment means extend,
    the attachment means including two elastic arms defining a housing for the end piece, the end piece being made from an at least partially amorphous metal material allowing the end piece to be temporarily deformed for insertion into the housing,
wherein the hand includes a base to attach the hand to a movement, and the two elastic arms are positioned at an opposite end of the hand from the base in a longitudinal direction of the hand.

\* \* \* \* \*

UNITED STATES PATENT AND TRADEMARK OFFICE
CERTIFICATE OF CORRECTION

| | | |
|---|---|---|
| PATENT NO. | : 11,156,964 B2 | |
| APPLICATION NO. | : 16/080946 | |
| DATED | : October 26, 2021 | |
| INVENTOR(S) | : Tommy Carozzani et al. | |

It is certified that error appears in the above-identified patent and that said Letters Patent is hereby corrected as shown below:

In the Claims

In Column 6, Claim 7, Line 22, delete "hand,." and insert -- hand, --, therefor.

Signed and Sealed this
Tenth Day of May, 2022

Katherine Kelly Vidal
*Director of the United States Patent and Trademark Office*